(12) United States Patent
Takahashi et al.

(10) Patent No.: US 10,857,998 B2
(45) Date of Patent: Dec. 8, 2020

(54) VEHICLE CONTROL DEVICE OPERATING SAFETY DEVICE BASED ON OBJECT POSITION

(71) Applicant: DENSO CORPORATION, Kariya (JP)

(72) Inventors: Toru Takahashi, Kariya (JP); Yosuke Ito, Kariya (JP)

(73) Assignee: DENSO CORPORATION, Kariya (JP)

(*) Notice: Subject to any disclaimer, the term of this patent is extended or adjusted under 35 U.S.C. 154(b) by 394 days.

(21) Appl. No.: 15/874,248

(22) Filed: Jan. 18, 2018

(65) Prior Publication Data

US 2018/0208193 A1 Jul. 26, 2018

(30) Foreign Application Priority Data

Jan. 20, 2017 (JP) ................................ 2017-008680

(51) Int. Cl.
*B60W 30/09* (2012.01)
*B60W 30/085* (2012.01)

(52) U.S. Cl.
CPC .......... *B60W 30/09* (2013.01); *B60W 30/085* (2013.01); *B60W 2554/00* (2020.02); *B60W 2710/18* (2013.01); *B60W 2710/20* (2013.01)

(58) Field of Classification Search
CPC ............... B60W 30/09; B60W 30/085; B60W 2554/00; B60W 2710/20; B60W 2710/18
See application file for complete search history.

(56) References Cited

U.S. PATENT DOCUMENTS

| 2012/0116663 | A1 | 5/2012 | Tsunekawa |
| 2016/0277941 | A1* | 9/2016 | Kim ................. H04W 52/0254 |
| 2016/0278065 | A1* | 9/2016 | Kim ..................... H04W 16/28 |
| 2017/0345312 | A1* | 11/2017 | Shimizu ................. G01S 13/87 |

FOREIGN PATENT DOCUMENTS

| JP | 2010-009232 | | 1/2010 |
| JP | 2016-052868 | | 4/2016 |
| JP | 2017025564 | * | 2/2017 |
| JP | 2017139229 | * | 7/2017 |

* cited by examiner

*Primary Examiner* — Russell Frejd
(74) *Attorney, Agent, or Firm* — Maschoff Brennan

(57) ABSTRACT

A vehicle control device including an acquisition unit for acquiring an object position detected by an object detection sensor, an identification determination unit for determining that a plurality of object positions relates the same object when the plurality of object positions is acquired by the acquisition unit, and a selection unit that selects a current target position from among the plurality of object positions based on the previous object position that was set as the operation target of a safety device in the case when the identification determination unit determines that the plurality of object positions relates to the same object, and an operation control unit for controlling the operation of the safety device based on the current target position.

4 Claims, 4 Drawing Sheets

VEHICLE CONTROL DEVICE OPERATING SAFETY DEVICE BASED ON OBJECT POSITION

CROSS-REFERENCE TO RELATED APPLICATION

This application is based on and claims the benefit of priority from earlier Japanese Patent Application No. 2017-8680 filed Jan. 20, 2017, the description of which is incorporated herein by reference.

BACKGROUND

Technical Field

The present disclosure relates to a vehicle control device for operating a safety device based on an object position.

Description of the Related Art

A pre-crash safety (PCS) control for mitigating or preventing collision damage between an own vehicle and objects (another vehicle, pedestrians, road structures and the like) located in front of the traveling direction of the own vehicle has been realized. In the PCS control, for example, a time to collision (TTC) which is the time until the own vehicle collides with an object is obtained from the distance between the own vehicle and the object and the relative speed, and a safety device such as an alert device and a brake device installed in the own vehicle is operated based on TTC.

For example, JP-A 2010-9232 discloses a PCS control in a state in which a plurality of objects are present in front of the own vehicle. Specifically, the vehicle control device of PTL 1 acquires a detection point for each of a plurality of objects, and calculates a TTC for each of the detection points. Moreover, the plurality of detection points are ranked each time based on each TTC calculated, and at that time, the detection point having the highest rank is selected as the operation target of the safety device, and whether the safety device is operated is determined for the operation target.

There are cases in which a plurality of detection points are acquired by a radar and the like for the object even though the object deemed to be the detection target in front of the own vehicle is actually one object. In such cases, it is considered that there are no large differences between each TTC of these plurality of detection points. Therefore, in the aforementioned vehicle control device, it is considered that the ranking between the detection points on the same object changes for each of the calculations of TTC. In such cases, there is the risk that the operation target of the safety device will frequently switch, and the operation of the safety device will become unstable.

SUMMARY

The present disclosure provides a vehicle control device which can appropriately select a detection point to be an operation target, and can properly operate a safety device.

A vehicle control device of the present disclosure is constituted in order for object detection sensors to detect the position of the object present in front of the traveling direction of the own vehicle, and operate a safety device for avoiding a collision of the own vehicle with an object or for mitigating the collision damage based on the detection result.

The vehicle control device of the present disclosure includes an acquisition unit that acquires an object position detected by the object detection sensor, an identification determination unit that determines that a plurality of object positions is on the same object when the plurality of object positions has been acquired by the acquisition unit, a selection unit that selects a current target position from among the plurality of object positions based on the previous object position which has been set as the target position of the safety device to operate, in the case where the identification determination unit determined that that the plurality of object positions is on the same object, and an operation control unit that controls the operation of the safety device based on the current target position.

In object detection, a plurality of object positions on the same object may be acquired even though there is actually one object (the same object). In such cases, it is considered that the target position which is the operation target of the safety device frequently switches, and there is the risk that the operation of the safety device will become unstable.

With regards to this point, in the aforementioned configuration, when a plurality of object positions have been acquired, it is determined that the plurality of object positions is on the same object, and in the case when it was determined that the plurality of object positions is on the same object, the current target position is selected from among the plurality of object positions based on the previous object position which was set as the target position. In this case, by selecting the current target position based on the previous object position which was set as the target position, the current target position can be selected while taking the switching of the target position into account. Therefore, even when a plurality of object positions on the same object have been acquired, it is possible to stably select the object position which is the target position, and consequently, the safety device can be operated properly.

DETAILED DESCRIPTION OF PREFERRED EMBODIMENTS

Figure 1:
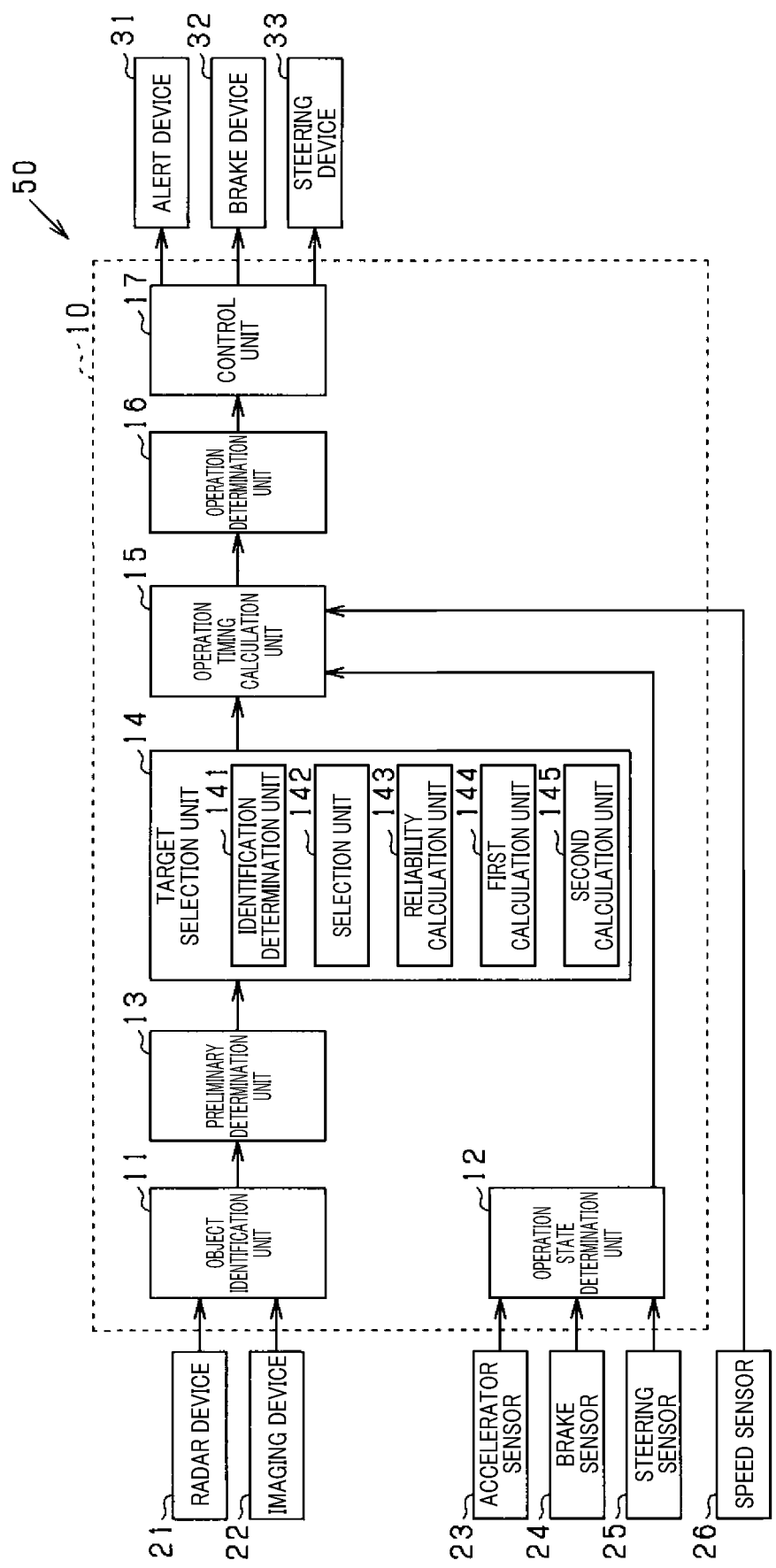
FIG. 1 is a block diagram showing a schematic configuration of a vehicle control device.

FIG. 1 shows a pre-crash safety system (hereinafter, referred to as PCSS) which is a vehicle control device. The PCSS is an example of a vehicle system installed in a vehicle, and detects an object which is present around the own vehicle, and when there is a possibility of the detected object colliding with the own vehicle, performs an operation for avoiding the collision of the own vehicle with the object, or an operation for mitigating the collision.

The own vehicle 50 shown in FIG. 1 comprises, a radar device 21 and an imaging device 22 as the object detection sensors, various sensors such as an accelerator sensor 23, a brake sensor 24, a steering sensor 25 and a speed sensor 26, an electronic control unit (ECU) 10, an alert device 31, a brake device 32, and a steering device 33 as the safety device. In the embodiment shown in FIG. 1, the ECU 10 functions as the vehicle control device.

The radar device 21 utilizes electromagnetic waves (survey waves) which have directivity such as a millimeter wave or a laser to detect the object in front of the own vehicle, and is attached so that the optical axis in the front portion of the own vehicle 50 faces the front of the own vehicle. The radar device 21 uses a radar signal to scan an area which spreads in a predetermined range toward the front of the own vehicle at predetermined intervals, and acquires the relative position (the object position), the relative speed and the like of each object as object information by receiving the electromagnetic waves reflected by the surface of the object in front of the own vehicle. When the own vehicle 50 is the origin, the object position is acquired as the relative coordinates of the position with the vehicle width direction of the own vehicle 50 defined as the X axis, and the traveling direction of the own vehicle 50 defined as the Y axis. In the object position, the component of the vehicle width direction (X axis) indicates the horizontal position of the object relative to the own vehicle 50, and a component of the traveling direction (Y axis) of the own vehicle 50 indicates the distance (the relative distance) from the front of the object. Note that, the object information acquired for each object is input into the ECU 10.

The imaging device 22 is an onboard camera, and is constituted using, for example, a charge-coupled device (CCD) camera, a complementary metal-oxide-semiconductor (CMOS) image sensor, a near-infrared camera and the like. The imaging device 22 is attached at a predetermined height (for example, near the top of the front windshield) in the center of the vehicle width direction of the own vehicle 50, and captures, from a bird's eye view point, an area that spreads toward the front of the own vehicle over a predetermined angle range. The captured images are input into the ECU 10 at each predetermined interval. Note that, the imaging device 22 may be a monocular camera, and may be a stereo camera.

In addition, an accelerator sensor 23 which detects the operation amount of the accelerator pedal, a brake sensor 24 which detects the operation amount of the brake pedal, a steering sensor 25 which detects the steering angle of the steering wheel and a speed sensor 26 which detects the speed of the own vehicle 50 are provided in the own vehicle 50. The detection results by these various sensors are input into ECU 10.

The alert device 31 uses a control command from the ECU 10 to alert the driver that an object is present in front of the own vehicle. The alert device 31 is constituted by, for example, a speaker provided in the passenger compartment, and a display unit for displaying the image.

The brake device 32 is a brake device for stopping the own vehicle 50. The brake device 32 operates when the possibility of a collision with the front of the object is high. Specifically, the braking force for the braking operation by the driver is made stronger (brake assist function), and automatic braking is performed unless the braking operation is performed by the driver (automatic brake function).

The steering device 33 is a device which controls the cruising path of the own vehicle 50. The steering device 33 operates when the possibility of a collision with the front of the object is high. Specifically, the steering operation is supported by the driver (steering avoidance support function), and automatic steering is performed unless the steering operation is performed by the driver (automatic steering function).

The ECU 10 is configured as a well-known microcomputer provided with a central processing unit (CPU) and various memory (ROM and RAM), and performs control in the own vehicle 50 with reference to the calculation program and the control data in the memory. The ECU 10 detects the object based on the object information input from the radar device 21 and the captured images input from the imaging device 22, and based on the detection result, a PCS which makes the alert device 31 as the safety device, and the brake device 32 and the steering device 33 as the control targets is performed.

As shown in FIG. 1, the ECU 10 comprises an object identification unit 11, an operation state determination unit 12, a preliminary determination unit 13, a target selection unit 14, an operation timing calculation unit 15, an operation determination unit 16 and a control unit 17.

The object identification unit 11 inputs the object information of each object from the radar device 21. Specifically, the radar position LT as the relative coordinates of the position, and the relative speed are identified for each object.

The object identification unit 11 inputs the captured images from the imaging device 22, and identifies the image position CT based on the captured images. Specifically, the type of object which is present in front of the own vehicle is identified by comparing the input captured images with prepared dictionary information for object identification by pattern matching. The dictionary information for object identification is separately prepared in accordance with the type of object, for example, a bicycle, motorcycle, pedestrian and road obstacles, and is stored in the memory. Moreover, the object identification unit 11 identifies the coordinate of the Y axis based on the vertical position of the object in the captured images, and identifies the coordinate of the X axis based on the horizontal position of the object in the captured images.

Further, based on the input of the radar device 21, and the image position CT based on the input of the imaging device 22, the object identification unit 11 associates the objects located in the vicinity of each other as objects based on the same object based on the radar position LT. Namely, the radar position LT is fused with the image position CT to produce a fusion position FT. Specifically, in the case when the radar search area which is set based on the radar position LT and the area overlaps with the image search area which is set based on the image position CT are present, the fusion position FT is produced. In this case, for example, the X coordinate of the fusion position FT is set as the X coordinate of the image position CT, and the Y coordinate of the fusion position FT is set as the Y coordinate of the radar position LT.

On the one hand, when the fusion position FT is not produced, for example, when the aforementioned radar search area does not overlap with the aforementioned image search area, the radar position LT and the image position CT are respectively identified. The identified object position is input in the preliminary determination unit 13.

Figure 2:
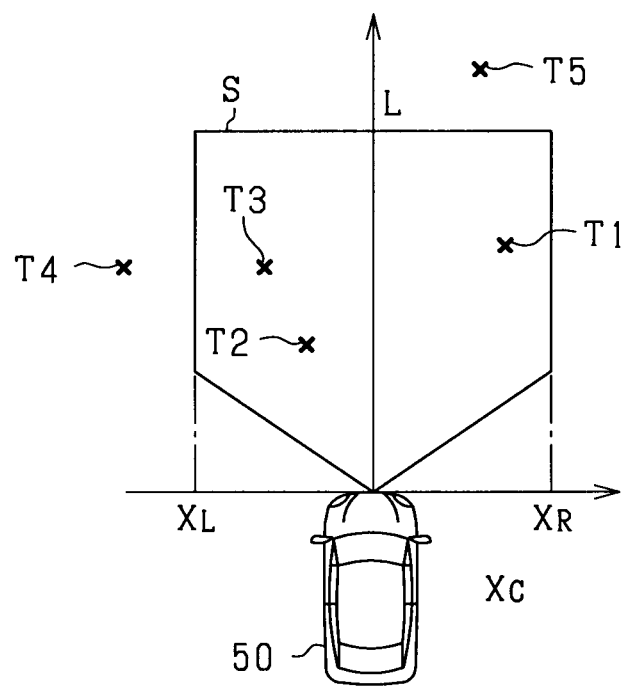
FIG. 2 is a diagram for explaining the object position acquired by a preliminary determination unit.

The preliminary determination unit 13 determines whether or not there is a possibility that the own vehicle 50 will collide with each object position input from the object identification unit 11. Specifically, the preliminary determination unit 13 sets a collision prediction area S in which the object is set as the operation target of the safety device. The collision prediction area S is set as an area partitioned by, for example, as shown in FIG. 2, a right regulation value XR and a left regulation value XL which are set as the regulation values of the vehicle width direction (X axis), and a depth L which is set as the regulation value of the traveling direction of the own vehicle 50. Note that, the right regulation value XR and the left regulation value XL may be changed in accordance with the type of object and the like.

Moreover, the preliminary determination unit 13 determines whether or not each object position input from the object identification unit 11 belongs in the collision prediction area S. When the object position belongs in the collision prediction area S, it is determined that there is a possibility that the own vehicle 50 will collide with an object position and the object position is acquired.

For example, in FIG. 2, a plurality of object positions (detection points) T1 to T5 in front of the own vehicle 50 are identified by the object identification unit 11, and among these object positions T1 to T5, the preliminary determination unit 13 determines that the object positions T1 to T3 belong in the collision prediction area S, and the object positions T1 to T3 are acquired. The acquired object positions T1 to T3 are input to the target selection unit 14. Note that, the object positions T1 to T5 of FIG. 2 indicate either the radar position LT, the image position CT or the fusion position FT. Note that, in the present embodiment, the object identification unit 11 and the preliminary determination unit 13 correspond to the "acquisition unit".

The target selection unit 14 selects a target position Tt to be the operation target of the safety device from among the object positions input from the preliminary determination unit 13. Specifically, the target position Tt is selected based on the object information pertaining to each object position which is input. Note that this will be explained in detail below.

The operation timing calculation unit 15 sets the operation timing for operating a safety device such as an alert device 31. When the operation timing is set, the determination result of the operation state determination unit 12 and the vehicle speed detected by the speed sensor 26 are added.

The operation state determination unit 12 determines whether or not the collision avoidance operation has been started by the driver in order to avoid a collision between the front of the object and the own vehicle 50. In the present embodiment, determination conditions relating to the driver's accelerator operation, brake operation and steering operation are included. For example, it is determined based on the steering angle detected by the steering sensor 25 that the collision avoidance operation has been started by the driver.

For example, when it was determined by the operation state determination unit 12 that the collision avoidance operation has been performed by the driver, the operation timing calculation unit 15 performs a process which delays the operation timing by making the value of the operation timing smaller than the operation timing of the reference.

The operation determination unit 16 determines whether or not to operate the safety device based on the time to collision (TTC) which is the time until the own vehicle 50 collides with the target position Tt selected by the target selection unit 14. Specifically, it is determined whether or not the TTC is less than the operation timing set by the operation timing calculation unit 15, and when the TTC is less than the operation timing, an operation signal indicating that the safety device is to be operated is output to the control unit 17.

The control unit 17 transmits a control command to the alert device 31, the brake device 32 and the steering device 33 when the operation signal output from the operation determination unit 16 is input. The safety device is operated based on the control command, and, for example, an alert to the driver is performed by the alert device 31, the brake control is performed by the brake device 32 and steering control is performed by the steering device 33. Note that, in the present embodiment, the operation determination unit 16 and the control unit 17 correspond to the "operation control unit".

Figure 3:
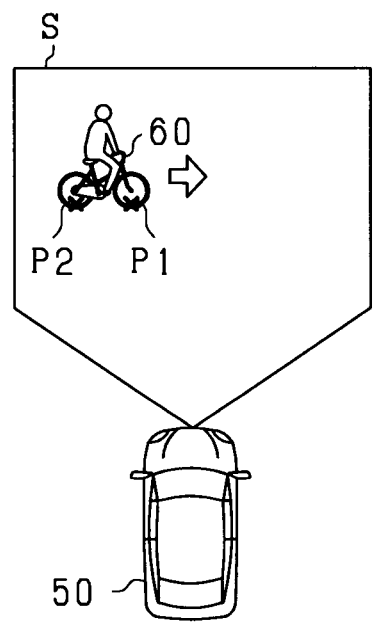
FIG. 3 is a diagram showing the case when a plurality of object positions is acquired for the same object.

There are cases a plurality of object positions are acquired regardless of whether the object that is to be detected in front of the vehicle 50 is actually one object. FIG. 3 shows the case when a bicycle 60 is present in front of the own vehicle 50, and object positions P1 and P2 on the bicycle 60 are acquired by the preliminary determination unit 13. In short, in this case, two (plural) object positions are acquired regardless of whether the bicycle 60 is the same object. Note that, the arrow in FIG. 3 indicates the movement direction of the bicycle 60, and in this case, the bicycle 60 is crossing from the left side of the traveling direction of the own vehicle 50 toward the right side of the traveling direction.

In this case, in the conventional vehicle control device, the target position Tt is selected based on the TTC from among the plurality of object positions. Specifically, the target selection unit 14 calculates the TTC for each object position input from the preliminary determination unit 13, and the object position having the smallest TTC among the calculated TTC is selected as the target position Tt.

Referring to FIG. 3, both the object positions P1 and P2 are object positions pertaining to the bicycle 60, thus, it is considered that the relative distance to an object position T1 and the relative speed are substantially equal to the relative distance to the object position T2 and the relative speed. In short, in this case, the TTC pertaining to the object position T1 and the TTC pertaining to an object position T2 are substantially equal. Therefore, the magnitude of the TTC between the object positions P1 and P2 can be changed each time the TTC is calculated by the detection error and the like when calculating the TTC. As a result, there is the risk that the target position Tt which is selected in the target selection unit 14 will frequently switch, and the operation of the safety device will become unstable.

In the present embodiment, when the plurality of object positions is acquired, it is determined that the plurality of object positions is on the same object. Moreover, in the case when it was determined that the plurality of object positions is on the same object, the current target position Tt is selected from among the plurality of object positions based on the previous object position set as the target position Tt. In short, when the plurality of object positions is acquired on the same object, the target position Tt can be stably selected by selecting the current target position Tt based on the previous target position Tt.

In the present embodiment, the target selection unit 14 comprises an identification determination unit 141, a selection unit 142, a reliability calculation unit 143, a first calculation unit 144 and a second calculation unit 145.

The identification determination unit 141 inputs the object position acquired by the preliminary determination unit 13. Namely, the object position belonging to the collision prediction area S among the object positions identified by the object identification unit 11 is input in the identification determination unit 141.

Further, the identification determination unit 141 determines that the plurality of object positions are on the same object when a plurality of object positions was input. Specifically, it is determined that the plurality of object positions is on the same object based on the distance (relative distance) to the own vehicle 50 of each object position, the relative speed, and the horizontal position in the direction orthogonal to the traveling direction of the own vehicle 50. In more detail, when all of the difference between the relative distance in one object position and the relative distance in the other object position is within a predetermined range, the difference between the relative speed in one object position and the relative speed in the other object position is within a predetermined range, and the difference between the horizontal position in one object position and the horizontal position in the other object position is within a predetermined range are satisfied, it is determined that the plurality of object positions is on the same object. Therefore, for example, it is determined that the object positions P1 and P2 pertaining to the bicycle 60 in FIG. 3 are on the same object.

Note that, as the same determination as stated above, when any one or two of the difference between the relative distance in one object position and the relative distance in the other object position is within a predetermined range, the difference between the relative speed in one object position and the relative speed in the other object position is within a predetermined range, and, the difference between the horizontal position in one object position and the horizontal position in the other object position is within a predetermined range are satisfied, it may be determined that the plurality of object positions is on the same object.

The selection unit 142 repeatedly selects the current target position Tt within a predetermined period based on the determination result of the identification determination unit 141. The selection unit 142 preferentially selects the object position as the current target position Tt when it was determined that the plurality of object positions is on the same object by the identification determination unit 141, and, when the object position is present as the previous target position Tt among the plurality of object positions.

On the one hand, the selection unit 142 selects the object position having a higher reliability which was calculated in the reliability calculation unit 143 from among the plurality of object positions when it was determined that the plurality of object positions is on the same object by the identification determination unit 141, and, when the object position set as the previous target position Tt is not present among the plurality of object positions, and, for example, when the plurality of object positions is acquired in the object which was detected for the first time.

The reliability calculation unit 143 calculates the reliability in the case when the identification determination unit 141 determined that the plurality of object positions is on the same object. The reliability is an index indicating the reliability (probability) of the position information of the object position, and means that if the reliability is high, the position accuracy of the object position is high, and means that if the reliability is low, the position accuracy of the object position is low. Various methods can be used when calculating the reliability, and in the present embodiment, the reliability is calculated by the presence of fusion. Namely, when the object position is a fusion position FT, the reliability calculation unit 143 calculates the reliability so as to be higher compared to when there is no the fusion position FT (in the case of the radar position LT or the image position CT).

As described using FIG. 3, for example if the previous target position Tt is the object position P2 among the object positions P1 and P2 pertaining to the bicycle 60, the selection unit 142 selects the object position P2 as the current target position Tt. Therefore, when the preliminary determination unit 13 acquires the object positions P1 and P2 on the bicycle 60, the object position P2 is continuously selected as the target position Tt. On the one hand, when the object positions P1 and P2 are acquired for the first time, either the object position P1 or P2 is selected based on the reliability. For example, if the object position P2 is the fusion position FT and the object position P1 is the radar position LT, the object position P2 in which the reliability is a predetermined value or greater is selected.

Figure 4:
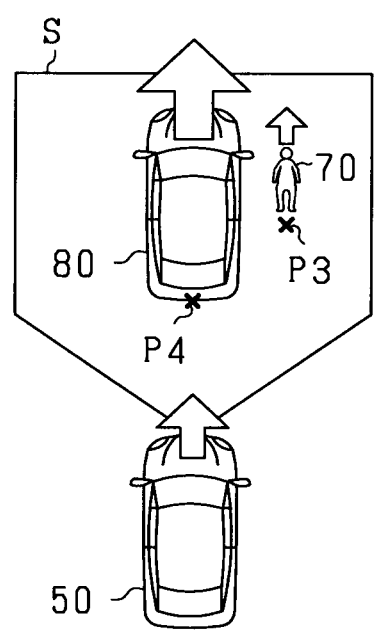
FIG. 4 is a diagram showing the case when the object positions are respectively acquired for a plurality of objects.

There are cases where there actually are a plurality of objects deemed to be the detection targets present in front of the own vehicle 50. In FIG. 4, a pedestrian 70 and a preceding vehicle 80 belong within the collision prediction area S, an object position P3 pertaining to pedestrians 70 and an object position P4 pertaining to the preceding vehicle 80 are acquired by the preliminary determination unit 13, and the object information pertaining to the object positions P3 and P4 is input in the target selection unit 14. Note that, in this case, the identification determination unit 141 determines that the object positions P3 and P4 are not on the same object.

When the identification determination unit 141 determined that the plurality of object positions are not on the same object in a state in which a plurality of object positions was acquired, the selection unit 142 selects the target position Tt based on an ETTC calculated by a first calculation unit 144. Specifically, the object position in which the ETTC is smaller among the plurality of object positions is selected as the current target position Tt.

Furthermore, when each ETTC of the plurality of object positions are equal to each other, the selection unit 142 selects the target position Tt based on the TTC calculated by a second calculation unit 145. Specifically, the object position in which the TTC is smaller among the plurality of object positions is selected as the current target position Tt.

The first calculation unit 144 calculates the ETTC (Enhanced TTC) as the first TTC. The ETTC is a value obtained by taking the relative acceleration A between the own vehicle 50 and the object position into account, and is calculated using a motion equation for uniform linear motion, for example, as shown in the following formula (1).

$$\text{ETTC} = -V \pm \sqrt{(V^2 - 2AD)}/A \tag{1}$$

Further, the second calculation unit 145 calculates the TTC as the second TTC. The TTC is a value obtained by dividing the relative distance D in the traveling direction (Y axis) between the own vehicle 50 and the object position by the relative speed V between the own vehicle 50 and the object position, and is calculated using a motion equation for the uniform linear motion, for example, as shown in the following formula (2).

$$\text{TTC} = -D/V \tag{2}$$

Therefore, the ETTC is calculated using the relative acceleration A, whereas the TTC is calculated without using the relative acceleration A. Note that, the relative speed V is a negative value when the own vehicle 50 is approaching the object, and is a positive value when the own vehicle 50 is moving away from the object. Further, the ETTC becomes an imaginary number when the expression $V^2 - 2AD$ inside the square root symbol $\sqrt{\ }$ in formula (1) is a negative value. This case shows the state in which the own vehicle 50 is moving away from the object, and shows that there is no possibility of a collision.

Considering the relative acceleration A in the scene in FIG. 4, for example, a preceding vehicle 80 accelerates and moves away from the own vehicle 50, whereas when a pedestrian 70 slows and approaches the own vehicle 50, if the ETTC pertaining to the object position P4 becomes an imaginary number, the object position P3 is selected as the current target position Tt based on the ETTC. In this case, with regards to the TTC, there is the possibility that the TTC pertaining to the object position P4 will become smaller than the TTC pertaining to the object position P3. Therefore, in the conventional vehicle control device which selects the target position Tt based on the TTC, the object position P3 can become the target position Tt, but the target position Tt can be selected taking sudden acceleration and deceleration into account by preferentially using the ETTC which considered the relative acceleration A.

Figure 5:
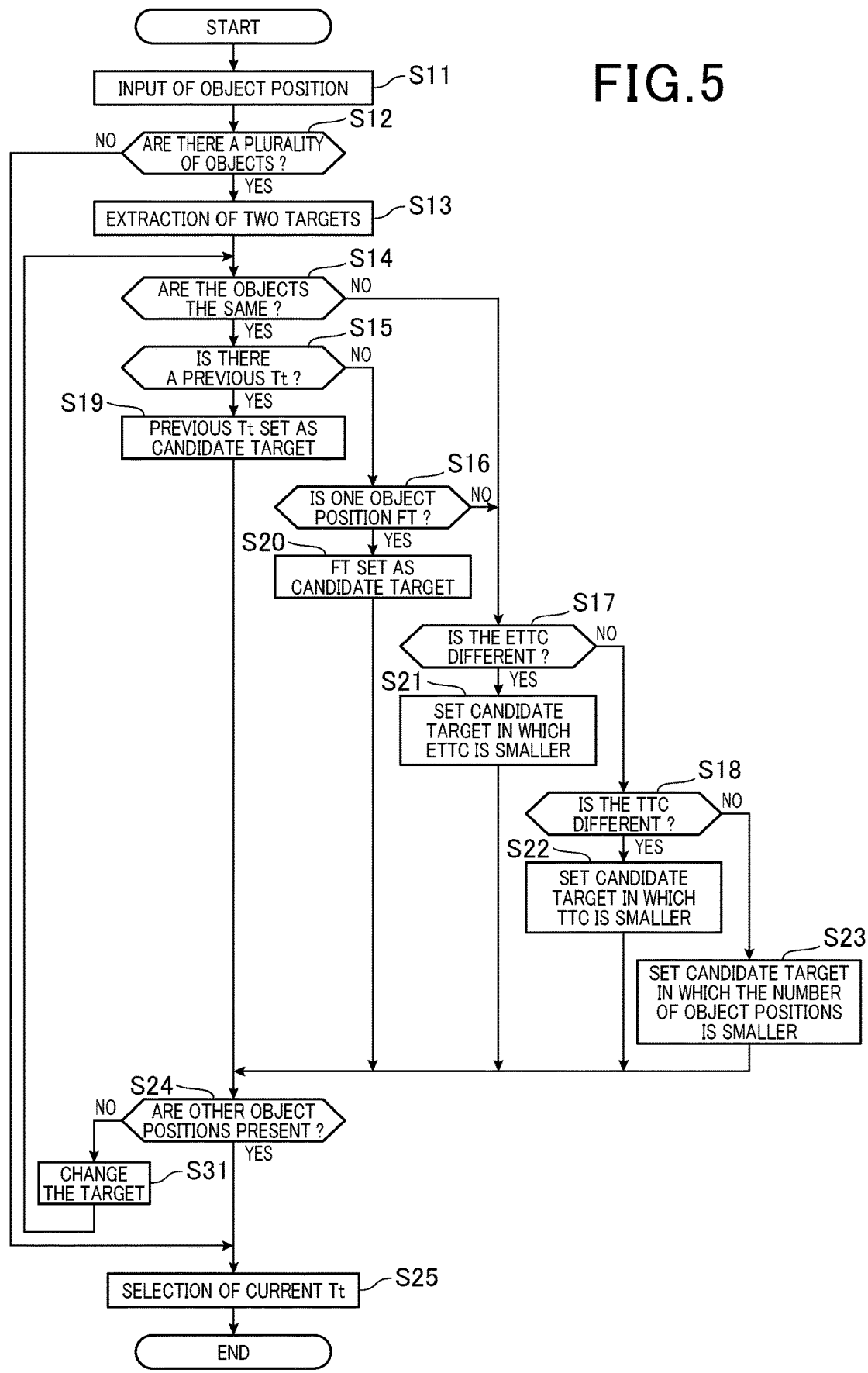
FIG. 5 is a flowchart showing a process for selecting the target position.

The process for selecting the target position Tt performed in the target selection unit 14 of the ECU 10 will be explained using the flowchart of FIG. 5. The process of selecting the target position Tt is repeatedly performed at a predetermined period.

In Step S11, the object position acquired by the preliminary determination unit 13 is input. In Step S12, it is determined whether or not the input object position is a plurality (two or more). When the determination at Step S12 was No, in short, when there is one object position input from the preliminary determination unit 13, the target position Tt is selected as the object position (Step S25).

When the determination at Step S12 was Yes, in short, when a plurality of object positions input from the preliminary determination unit 13 are present, the process proceeds to Step S13, and two targets (object positions) are arbitrarily extracted from among the plurality of object positions. Note that, the extraction of the object position in Step S13 is not specifically limited, for example, the object position may be extracted in ascending order of the number of object positions.

In Step S14, it is determined whether or not the two object positions which were extracted in Step S13 are present on the same object. It is determined whether or not the relative distance, the relative speed, and the horizontal position of one object are close to the relative distance, the relative speed, and the horizontal position of the other object respectively. For example, when the difference of the relative distance between the two object positions is 50 cm or less, the difference of the relative speeds is 2 km/h or less, and the difference of the horizontal positions is 1 m or less, it is determined that the two object positions are present on the same object. In the case when Step S14 was affirmed, the process proceeds to Step S15.

Moreover, Steps S15 to S18 are processes for selecting the target position Tt from among the two object positions present on the same object. Namely, Step S15 determines whether or not the object position which was set as the previous target position Tt is present, Step S16 determines whether or not one object position is the fusion position FT, Step S17 determines whether or not the ETTC is different, and Step S18 determines whether or not the TTC is different among the two object positions. Namely, in the present embodiment, when the plurality of object positions has been acquired on the same object, the target position Tt is selected in the order of (1) the object position which was set as the previous target position Tt, (2) the fusion position FT, (3) the object position in which the ETTC is small, and (4) the object position in which the TTC is small.

Moreover, if Step S15 was YES, the object position which was set as the previous target position Tt is selected as a candidate target (Step S19), and if Step S15 was NO and Step S16 was YES, the fusion position FT is selected as the candidate target (Step S20). Further, when Step S16 was NO, in short, when both of the two object positions are the fusion position FT or both of the two object positions are not the fusion position FT, the process proceeds to Step S17. Moreover, if Step S17 was YES, the object position in which the ETTC is smaller is selected as the candidate target (Step S21), and if Step S17 was NO and Step S18 was YES, the object position in which the TTC is smaller is selected as the candidate target (Step S22).

On the one hand, if Step S18 was NO, the candidate target having a smaller number of object positions is selected (Step S23). Note that, the present embodiment is constituted so that the number of object positions is assigned in a sequentially ascending order of the detected object positions. In short, in Step S23, the previously detected object positions are selected in chronological order as the candidate targets.

On the one hand, when Step S14 was denied, in short, when it was determined that the two object positions extracted in Step S13 are not present on the same object, it is assumed that there actually are a plurality of objects present, and the process proceeds to Step S17. In such cases, the target position Tt is selected in the order of (1) the object position in which the ETTC is smaller and (2) the object position in which the TTC is smaller.

As stated above, in Steps S19 to S23, if the object position which is the candidate target is selected from among two object positions extracted in Step S13, the process proceeds to Step S24. In Step S24, it is determined whether or not object positions other than the two object positions extracted in Step S13 are not present. In the case when the determination at Step S24 was Yes, in short, when the other object positions are not present, the process proceeds to Step S25, and the candidate target is selected as the target position Tt.

On the one hand, when Step S24 was denied, in short, when another object position is present, the candidate targets are maintained and the object position which is not the candidate target is changed (Step S31), and the process proceeds to Step S14. Moreover, in Step S14, it is determined whether or not the two object positions which are new combination are present on the same object, and the process proceeds to the following step. In short, Step S24 is affirmed, and the processes of Steps S14 to S23 are repeated until the candidate targets are narrowed down to one. Moreover, the object position finally selected as the candidate target is selected as the target position Tt (Step S25).

The following excellent result can be obtained by the present embodiment described in detail above.

In the aforementioned configuration, when the plurality of object positions was acquired, it is determined that the plurality of object positions is on the same object, and in the case when it was determined that the plurality of object positions is on the same object, the current target position Tt is selected from among the plurality of object positions based on the previous object position which was set as the target position Tt. In this case, by selecting the current target position Tt based on the previous object position which was set as the target position Tt, the current target position Tt can be selected while taking the fact that the target position Tt is switched into account. Therefore, even when a plurality of object positions are acquired on the same object, the object position to be the target position Tt can be stably selected, and thus, the safety device can be properly operated.

Specifically, when the object position which was set as the previous target position Tt is present in the plurality of object positions in a state in which a plurality of object positions are present on the same object, the previous target position Tt is selected as the current target position Tt, thus, the current target position Tt is not changed from the previous target position Tt. Therefore, the safety device can be stably operated.

On the one hand, when the object position which was set as the previous target position Tt is not present in the plurality of object positions in a state in which a plurality of object positions are acquired on the same object, the fusion position FT is selected as the current target position Tt, thus, the object position having a high position accuracy can be selected as the current target position Tt. Further, for example, when a plurality of object positions are acquired on the object which is detected for the first time, the fusion position FT is selected from among the plurality of object positions as the current target position Tt, and in this case, once the fusion position FT is selected, as long as the plurality of object positions are thereafter acquired on the object, the fusion position FT is continuously selected as the target position Tt, thus, the safety device can be properly operated.

In the aforementioned configuration, when a plurality of object positions in front of the own vehicle 50 are acquired, and, the object position which was set as the previous target position Tt is present in the plurality of object positions, the object position is preferentially selected as the current target position Tt when it was determined that these object positions are on the same object, and the object position in which the ETTC is smaller is selected as the current target position Tt. when it was determined that the plurality of object positions are not on the same object, In this case, the aspects of the selection of the target position Tt were different in accordance with the plurality of object positions present on the same object, or present on objects which are different from each other, thus, depending on the state, indices suitable for the selection of the target position Tt can be used preferentially, and the target position Tt can be appropriately selected in accordance with each state.

In this case, when the plurality of object positions is on objects which are different from each other, the target position Tt is selected based on the ETTC in consideration of the relative acceleration A, thus, by taking the sudden acceleration and deceleration of the object into account, the object position which is set as the target position Tt can be selected.

Furthermore, when it is determined that the plurality of object positions are not on the same object, and, the first TTC of the plurality of object positions is equal, the object position in which the second TTC is smaller was selected as the current target position Tt, thus, even when the target position Tt cannot be selected based on the first TTC, the object position in which the possibility of a collision is high can be preferably selected by selecting the target position Tt based on the second TTC.

Further, when a plurality of object positions on the same object are acquired, it is considered that the positions of these objects are approximately equal to each other in terms of the relative distance between each object position and the own vehicle, the relative speed between each object position and the own vehicle, and the horizontal position between each object position and the own vehicle. In consideration thereof, when all of the difference between the relative distance in one object position and the relative distance in the other object position is within a predetermined range, the difference between the relative speed in one object position and the relative speed in the other object position is within a predetermined range, and the difference between the horizontal position in one object position and the horizontal position in the other object position is within a predetermined range are satisfied, it is determined that the plurality of object positions is on the same object, thus, it can be accurately determined that the plurality of object positions is on the same object.

OTHER EMBODIMENTS

The aforementioned embodiment is constituted to select the previous target position Tt as the current target position Tt when the object position which was set as the previous target position Tt is present among the plurality of object positions, in a state in which a plurality of object positions was acquired on the same object, but this configuration may be changed. For example, the object position selected as the target position Tt a predetermined number of times or more in the past among the plurality of object positions may be selected as the current target position Tt, and, the object position continuously selected as the target position Tt a predetermined number of times or more in the past among the plurality of object positions may be selected as the current target position Tt. Note that, the predetermined number of times is a value of two or more.

In the aforementioned embodiment, the reliability calculation unit 143 was constituted to calculate the reliability based on the presence of fusion, but it is not limited thereto. For example, the reliability calculation unit 143 may be constituted to calculate the reliability based on a continuously detected continuous detection time. In this kind of configuration, the longer the continuous detection time, the higher the reliability calculated. Further, the acquired object position may be constituted to be calculated so that the reliability is different between the radar position LT and the image position CT.

In the aforementioned embodiment, the ECU 10 was applied to a vehicle equipped with the radar device 21 and the imaging device 22 as the object detection sensors, but this configuration may be changed, and the ECU 10 may be applied to a vehicle equipped with only the radar device 21 as the object detection sensor, or a vehicle equipped with only the imaging device 22 as the object detection sensor. Note that, in such cases, the reliability calculation unit 143 may use the abovementioned continuous detection time and the like to calculate the reliability.

What is claimed is:

1. A vehicle control device that detects a position of an object present in front of a traveling direction of an own vehicle using an object detection sensor, and operates a safety device for avoiding a collision of the own vehicle with the object or for mitigating collision damage based on a detection result, the vehicle control device comprising:
an acquisition unit that acquires an object position detected by the object detection sensor;
an identification determination unit that determines, when a plurality of object positions is acquired by the acquisition unit, the plurality of object positions is on the same object;
a selection unit that selects a current target position as a target of the safety device to operate, from among the plurality of object positions on the same object determined by the identification determination unit, based on a previous object position set as a previous target position that was a target of the safety device to operate; and
an operation control unit that controls operation of the safety device based on the current target position, wherein in a case in which the identification determination unit determines that the plurality of object positions is on the same object and when an object position that was set as the previous target position is present among the plurality of object positions, the selection unit preferentially selects the object position set as the previous target position to be the current target position, vehicle control device includes a reliability calculation unit that calculates a reliability relating to position accuracy for each object position in a case in which the identification determination unit determines that the plurality of object positions is on the same object, and the selection unit selects the object position in which the reliability is in a predetermined range or more as the current target position when the object position that was set as the previous target position is not present in the plurality of object positions.

2. The vehicle control device according to claim 1, wherein the identification determination unit determines that the plurality of object positions is on the same object based on a distance between the own vehicle from each object position acquired by the acquisition unit, the relative speed, and a horizontal position in a direction orthogonal to the traveling direction of the own vehicle.

3. A vehicle control device that detects a position of an object present in front of a traveling direction of an own vehicle using an object detection sensor, and operates a safety device for avoiding a collision of the own vehicle with the object or for mitigating collision damage based on a detection result, the vehicle control device comprising:

an acquisition unit that acquires an object position detected by the object detection sensor;

an identification determination unit that determines, when a plurality of object positions is acquired by the acquisition unit, the plurality of object positions is on the same object;

a selection unit that selects a current target position as a target of the safety device to operate, from among the plurality of object positions on the same object determined by the identification determination unit, based on a previous object position set as a previous target position that was a target of the safety device to operate; and an operation control unit that controls operation of the safety device based on the current target position, wherein the vehicle control device includes a calculation unit that respectively calculates, in each acquired object position, a time to collision (TTC) defined as a time until the own vehicle collides with the object positions based on a distance between the own vehicle and the object position, a relative speed, and a relative acceleration, and wherein the selection unit determines that the plurality of object positions identified by the identification determination unit is on the same object, in a state in which a plurality of object positions in front of the traveling direction of the own vehicle were acquired, and, preferentially selects the object position as the current target position, when the object position that was set as the previous target position is present among the plurality of object positions, and selects the object position in which the TTC is smaller from among the plurality of object positions as the current target position when the identification determination unit determined that the plurality of object positions are not on the same object.

4. A vehicle control device that detects a position of an object present in front of a traveling direction of an own vehicle using an object detection sensor, and operates a safety device for avoiding a collision of the own vehicle with the object or for mitigating collision damage based on a detection result, the vehicle control device comprising:

an acquisition unit that acquires an object position detected by the object detection sensor;

an identification determination unit that determines, when a plurality of object positions is acquired by the acquisition unit, the plurality of object positions is on the same object;

a selection unit that selects a current target position as a target of the safety device to operate, from among the plurality of object positions on the same object determined by the identification determination unit, based on a previous object position set as a previous target position that was a target of the safety device to operate;

an operation control unit that controls operation of the safety device based on the current target position, and a calculation unit that respectively calculates, in each acquired object position, a time to collision (TTC) defined as a time until the own vehicle collides with the object positions based on a distance between the own vehicle and the object position, a relative speed, and a relative acceleration, wherein the selection unit determines that the plurality of object positions identified by the identification determination unit is on the same object, in a state in which a plurality of object positions in front of the traveling direction of the own vehicle were acquired, and, preferentially selects the object position as the current target position, when the object position that was set as the previous target position is present among the plurality of object positions, and selects the object position in which the TTC is smaller among the plurality of object positions as the current target position when the identification determination unit determined that the plurality of object positions are not on the same object, wherein the calculation unit includes a first calculation unit and a second calculation unit, the first calculation unit calculates a first TTC as the TTC, and the second calculation unit calculates a second TTC that is the time until the own vehicle collides with the object position based on the distance between the own vehicle and the object position and the relative speed in each acquired object position, and wherein the selection unit determines that the plurality of object positions identified by the identification determination unit are not on the same object, in a state in which a plurality of object positions in front of the traveling direction of the own vehicle were acquired, and, selects the object position in which the second TTC is smaller among the plurality of object positions as the current target position when the first TTC of the plurality of object positions is equal among the plurality of object positions.

* * * * *